(12) United States Patent
Wen et al.

(10) Patent No.: US 12,203,230 B2
(45) Date of Patent: Jan. 21, 2025

(54) METHOD FOR CARRYING OUT ECOLOGICAL WATER SUPPLEMENT BY USING TIDAL POWER

(71) Applicant: South China Institute of Environmental Sciences, MEE, Guangzhou (CN)

(72) Inventors: Jing Wen, Guangzhou (CN); Luping Zeng, Guangzhou (CN); Hongwei Du, Guangzhou (CN); Bangjie Huang, Guangzhou (CN); Wenjing Li, Guangzhou (CN); Xiuqin Tan, Guangzhou (CN); Zhipeng Guo, Guangzhou (CN); Yangliang Gu, Guangzhou (CN); Yingmin Zhang, Guangzhou (CN); Huaiyang Fang, Guangzhou (CN); Fantang Zeng, Guangzhou (CN)

(73) Assignee: South China Institute of Environmental Sciences, MEE, Guangzhou (CN)

( * ) Notice: Subject to any disclaimer, the term of this patent is extended or adjusted under 35 U.S.C. 154(b) by 0 days.

(21) Appl. No.: 18/665,756

(22) Filed: May 16, 2024

(65) Prior Publication Data
US 2024/0410125 A1 Dec. 12, 2024

(30) Foreign Application Priority Data
Jun. 8, 2023 (CN) .......................... 202310676027.1

(51) Int. Cl.
*E02B 7/20* (2006.01)
(52) U.S. Cl.
CPC .................. *E02B 7/205* (2013.01)

(58) Field of Classification Search
CPC .................................. E02B 3/00; E02B 7/205
See application file for complete search history.

(56) References Cited

U.S. PATENT DOCUMENTS 2,455,234 A * 11/1948 Crick ........................ E02B 3/00
405/107
2010/0310314 A1 12/2010 Juel

FOREIGN PATENT DOCUMENTS

| CN | 104652352 | 5/2015 |
| CN | 108330898 | 7/2018 |

(Continued)

OTHER PUBLICATIONS

SIPO Notice of the First Office Action dated Nov. 8, 2023 in application No. 202310676027.1.

(Continued)

*Primary Examiner* — Janine M Kreck
(74) *Attorney, Agent, or Firm* — Pilloff Passino & Cosenza LLP; Rachel Pilloff; Sean Passino

(57) ABSTRACT

Disclosed is a method for carrying out ecological water supplement by using tidal power, including the following steps: constructing a first water supplying river channel at an upper and middle reach of an artery and tributaries of a river channel, storing water at high tide and supplying water to the tributaries at low tide based on the first water supplying river channel; and setting a storage tank at an urban river channel, constructing a second water supplying river channel at an other end of the storage tank connected with the urban river channel, and supplying the water to a city based on the interconnected storage tank, the urban river channel and the second water supplying river channel.

3 Claims, 8 Drawing Sheets

(56) References Cited

FOREIGN PATENT DOCUMENTS

| | | | | |
|---|---|---|---|---|
| CN | 111733759 A | * | 10/2020 | ............... E02B 1/02 |
| CN | 112343014 | | 2/2021 | |
| CN | 112726486 | | 4/2021 | |
| DE | 102010026904 A1 | * | 1/2012 | ............... E02B 3/00 |
| GB | 2615860 A | * | 8/2023 | ............... E02B 3/00 |
| JP | 2005299277 | | 10/2005 | |
| KR | 20210015434 A | * | 2/2021 | |
| WO | WO-2021238567 A1 | * | 12/2021 | ............... E02B 1/02 |

OTHER PUBLICATIONS

SIPO search report dated Nov. 8, 2023 in application No. 202310676027.1.
SIPO search report dated Dec. 21, 2023 in application No. 202310676027.1.
SIPO Notification to Grant Patent Right for Invention dated Jan. 6, 2024 in application No. 202310676027.1.

* cited by examiner

METHOD FOR CARRYING OUT ECOLOGICAL WATER SUPPLEMENT BY USING TIDAL POWER

CROSS-REFERENCE TO RELATED APPLICATIONS

This application claims priority to Chinese Patent Application No. 202310676027.1, filed on Jun. 8, 2023, the contents of which are hereby incorporated by reference.

TECHNICAL FIELD

The application belongs to the technical field of water ecological restoration, and in particular relates to a method for carrying out ecological water supplement by using tidal power.

BACKGROUND

With the accelerated development of urbanization and industrialization, water resources are becoming increasingly scarce, demanding and difficult to manage. Meanwhile, the pollution and destruction of water resources are becoming more and more serious. Water system connectivity has become an effective means to improve the ecological water demand of rivers and lakes and ensure the health of aquatic organisms and their habitats. The connection of water system ensures the smooth flow of material, information and species. By speeding up the replacement of water bodies, some river sections are prevented from eutrophication, and the stability and ecological service function of river and lake ecosystems are maintained.

However, in the actual ecological water supplement operation of tributaries, the existing water system connection technology mainly artificially controls the gate dams to supply water to tributaries when the flow of some tributaries is insufficient. At present, the common methods of ecological water supplement through water system connection have some problems, such as water transfer lag, poor feasibility of actual operation and cumbersome situation.

Therefore, it is necessary to improve the technology of daily supplement of tributary ecological water demand.

SUMMARY

The objective of the application is to provide a method for carrying out ecological water supplement by using tidal power, so as to solve the problems existing in the prior art.

In order to achieve the above objective, the application provides a method for carrying out ecological water supplement by using tidal power, includes the following steps:

constructing a first water supplying river channel at an upper and middle reach of an artery and tributaries of a river channel, storing water at high tide and supplying water to the tributaries at low tide based on the first water supplying river channel; and setting a storage tank at an urban river channel, constructing a second water supplying river channel at an other end of the storage tank connected with the urban river channel, and supplying the water to a city based on the interconnected storage tank, the urban river channel and the second water supplying river channel.

Optionally, a process of storing the water at high tide and supplying the water to tributaries at low tide based on the water supplying river channel includes:

setting a first gate at an intersection of the first water supplying river channel and the tributaries, and setting a second gate at an intersection of the first water supplying river channel and the artery;

at high tide, closing the first gate, and opening the second gate to allow the water of the artery to enter the first water supplying river channel, so that the first water supplying river channel is capable of storing water of the artery; and at low tide, closing the second gate, and when the water supplement is needed for the tributaries, opening the first gate to perform the water supplement for the tributaries.

Optionally, opening and closing time of the second gate is an automatical opening and closing at time points corresponding to a high tide level and a low tide level based on a daily ebb and flood schedule and data of a tidal observation station, and adjusting an opening and closing state in real time according to a water flow direction based on a water flow direction monitoring device.

Optionally, a process of supplying the water to the city based on the interconnected storage tank, the urban river channel and the second water supplying river channel includes:

setting a regulating sluice at a joint of the storage tank and the second water supplying river channel, and a miter sluice is arranged at a joint of the storage tank and the urban river channel;

storing the water based on the storage tank and the miter sluice at high tide; and when the urban river channel is short of water, performing a water supplement for the urban river channel based on the storage tank, the regulating sluice and the second water supplying river channel.

Optionally, a process of storing water based on the storage tank and the miter sluice at high tide and low tide includes:

at high tide, closing the regulating sluice, and the miter sluice is automatically opened based on a high water level after the tide rises, so that the water flows into the storage tank;

at low tide, closing the miter sluice, and closing the miter sluice based on overflow water flow, and closing the miter sluice based on a water level difference between inside and outside, and making the storage tank store water.

Optionally, a process of performing the water supplement for the urban river channel based on the storage tank, the regulating sluice and the second water supplying river channel includes:

opening the regulating sluice based on a gear motor driving system, and making the water stored in the storage tank enter the urban river channel through the second water supplying river channel based on the high water level in the storage tank.

Optionally, in a process of opening the miter sluice, making a gate opened by the miter sluice not capable of being parallel to a water inlet direction based on a water-blocking platform; at low tide, making the water flows out from a direction perpendicular to the gate based on the water-blocking platform, and pushing the gate of the miter sluice to be closed initially.

Optionally, setting a slag-blocking net and a slow-flow sedimentation area in front of the gate of the miter sluice, reducing sediment deposition during gate opening and closing activities based on the slag-blocking net and the slow-flow sedimentation area, designing a concave structure in front of the water-blocking platform, and collecting sediment entering the storage tank based on the concave structure.

The application has the technical effects that:

according to the application, by constructing the first water supplying river channel and setting the gate, the gate may be automatically controlled according to the ebb and flood, and the artery may continuously perform the ecological water supplement to the tributaries, thus improving the hydrodynamic conditions and enriching the species diversity.

By constructing the storage tank and the second water supplying river channel, and combining the miter sluice with the laminated water-blocking platform, the effect of automatically opening the gate with tidal power at high tide and automatically closing the gate at low tide is realized, thus effectively storing water. This process does not need manual intervention, and does not need electricity to drive the gate of the storage tank, so that the storage tank may realize automatic water storage without using additional energy. When it is necessary to carry out ecological water supplement to the river channel, the opening degree and duration of the regulating sluice at the water supplement end of the storage tank may be controlled manually according to the water supplement demand, so as to realize the ecological water supplement to the water-deficient river channel.

BRIEF DESCRIPTION OF THE DRAWINGS

The accompanying drawings, which constitute a part of this application, are used to provide a further understanding of this application. The illustrative embodiments of this application and their descriptions are used to explain this application, and do not constitute an improper limitation of this application. In the attached drawings.

DETAILED DESCRIPTION OF THE EMBODIMENTS

It should be noted that the embodiments in this application and the features in the embodiments may be combined with each other without conflict. The present application will be described in detail with reference to the attached drawings and embodiments.

It should be noted that the steps shown in the flowchart of the drawings may be executed in a computer system such as a set of computer-executable instructions, and although the logical order is shown in the flowchart, in some cases, the steps shown or described may be executed in a different order from here.

Embodiment 1

As shown in FIG. 1-FIG. 8, this embodiment provides a method for carrying out ecological water supplement by using tidal power, including:

The artery supplies water to the tributaries: a water supplement reach is built near the upper and middle reach of the artery and tributaries, and a gate dam is set to control the water flow, so that the water of the artery may enter the water supplying river channel at high tide by using tidal jacking effect, and the gate between the artery and the water supplying river channel is closed at low tide, so that the water mass may enter the tributaries at low tide, thus realizing ecological water supplement.

Application of urban river channel water supplement (urban river channel, water supplement from the middle and lower reaches to the upper reaches): when the downstream tide rises, the storage tank is used to temporarily store water, and then when the river is short of water, the stored water may be supplemented to the upstream area, and combined meandering area, the downstream area may be supplemented to the upstream area to solve the problem of water shortage in the river channel after urban sewage interception.

In the above two recharge modes, attention may be paid to the elevation of the gate and the junction with the tributary river channel or the upstream and downstream, so that the water mass may be transported spontaneously under the action of gravity flow.

The specific steps of the above two water supplement modes are as follows:

Artery-Supply-for-Tributary

Figure 1:
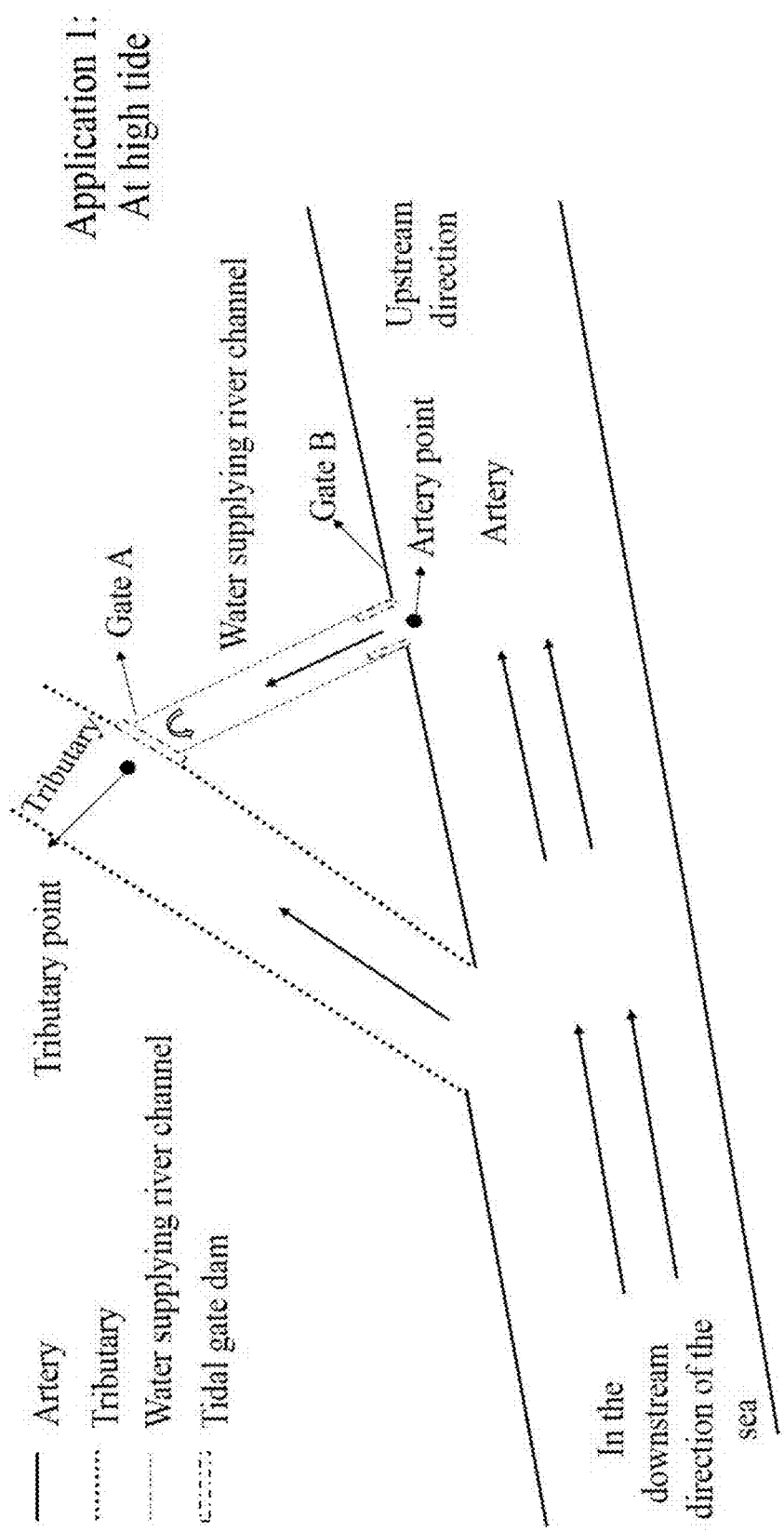
FIG. 1 is a schematic diagram of the application process of the artery-supply-for-tributary mode at high tide in the embodiment of the application.
Figure 2:
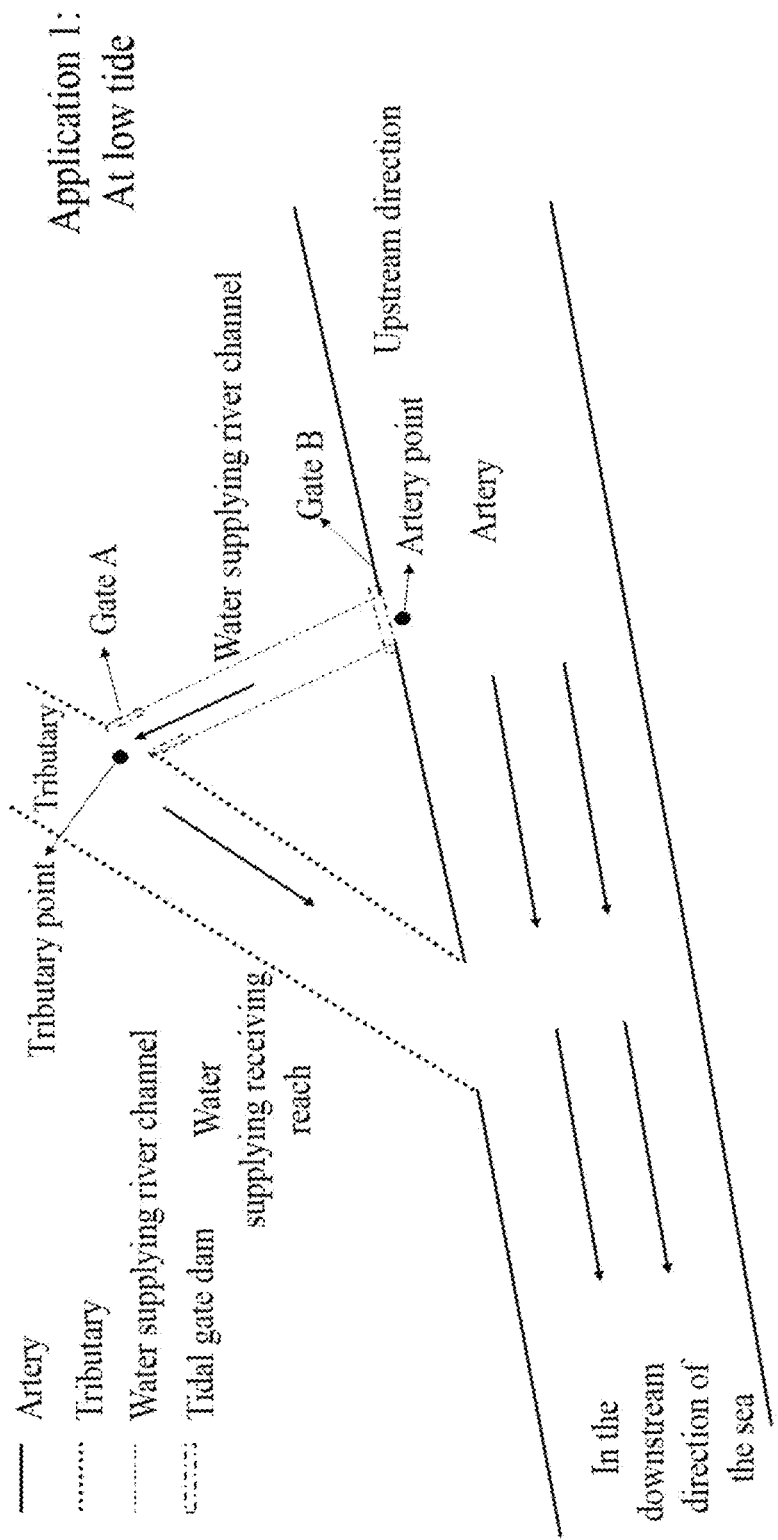
FIG. 2 is a schematic diagram of the application process of the artery-supply-for-tributary mode at low tide in the embodiment of the application.

As shown in FIG. 1 and FIG. 2, the tidal power is used to adjust the two gates of the water supplement section. At high tide, the gate at the water diversion end is opened, and the gate at the water supplement section is closed. At high tide (the highest tide) or when the water flow direction changes to downstream, the gate at the water diversion section is closed, so that the water mass stays in the water supplement river channel, and then the gate at the upper end leading to the tributary that needs water supplement is opened, so that the water mass may replenish water to a specific tributary.

The switching control methods of the first gate and the second gate are as follows:

1. According to the daily ebb and flood schedule, the data of the tidal observation station near the point where the river is located are crawled every day, and the sluice at the water diversion end is automatically opened and closed at the time point corresponding to the high tide level and the low tide level.

2. Through a simple water flow direction monitoring device, the regulating sluice is controlled in linkage. According to the water flow direction, if the water flows upstream (stable for 5 minutes, to avoid the water flow direction is not fixed when the high tide level and low tide level occur, the water flow will be stagnant), the regulating sluice at the water diversion end will be opened, otherwise the regulating sluice will be closed.

The tributary downstream-supply-for-upstream mode is mainly applied to urban rivers to solve the problem of water shortage in the upper and middle reach of urban rivers after sewage interception. In this application, an additional storage tank for water storage is built.

Figure 3:
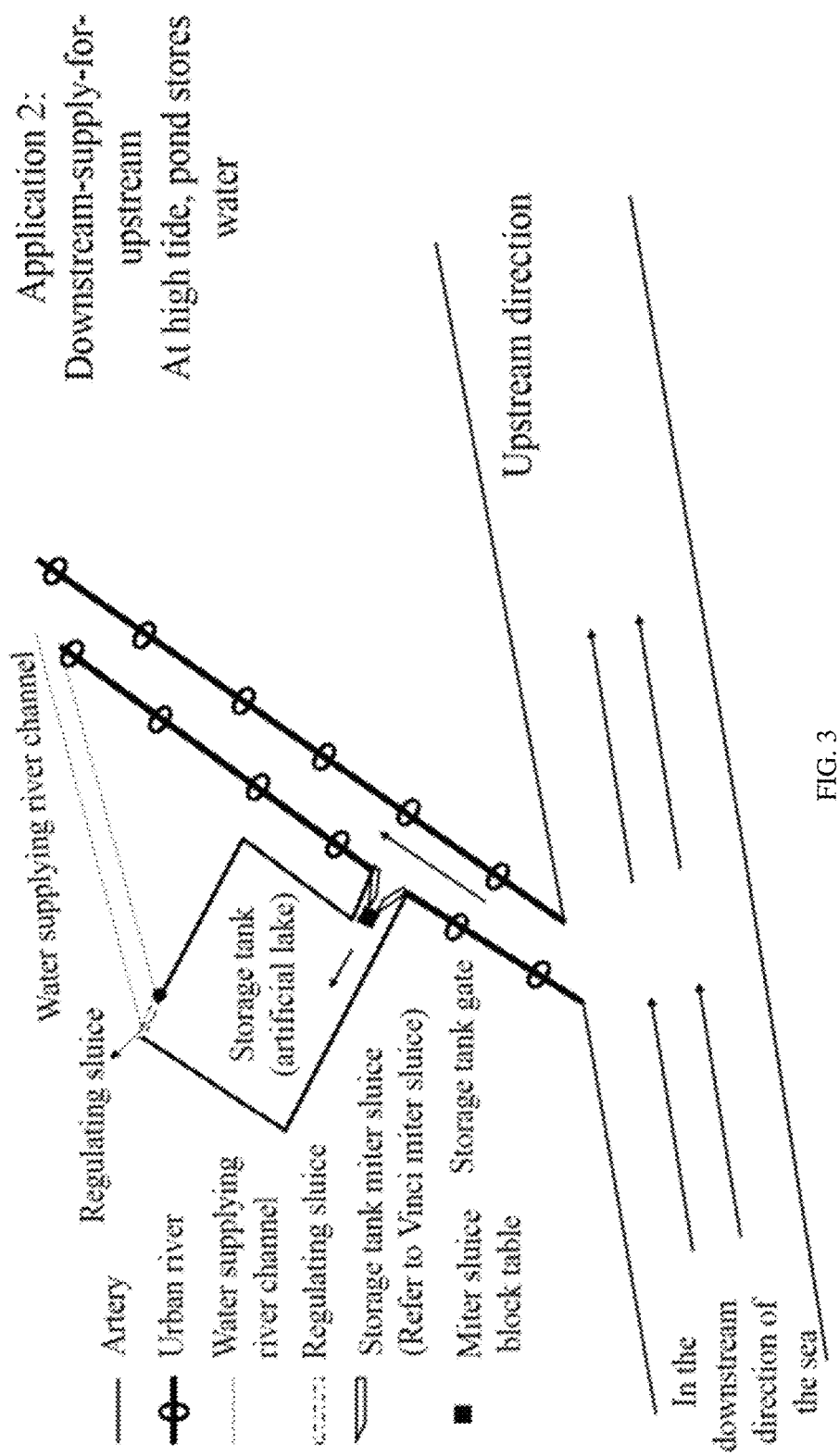
FIG. 3 is a schematic diagram of the application process of the tributary downstream-supply-for-upstream mode at high tide in the embodiment of the application.
Figure 4:
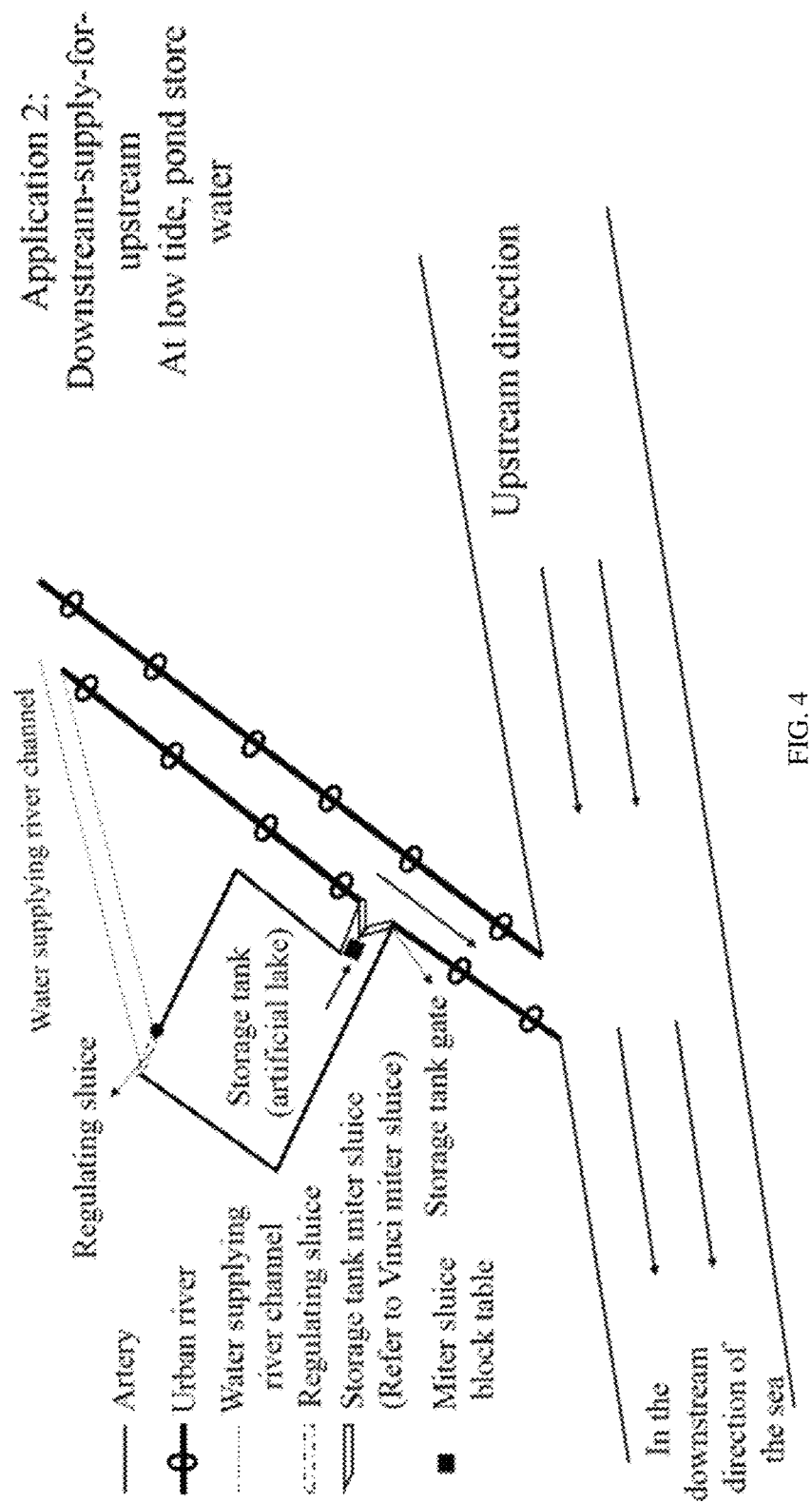
FIG. 4 is a schematic diagram of the application process of the tributary downstream-supply-for-upstream mode at low tide in the embodiment of the application.
Figure 5:
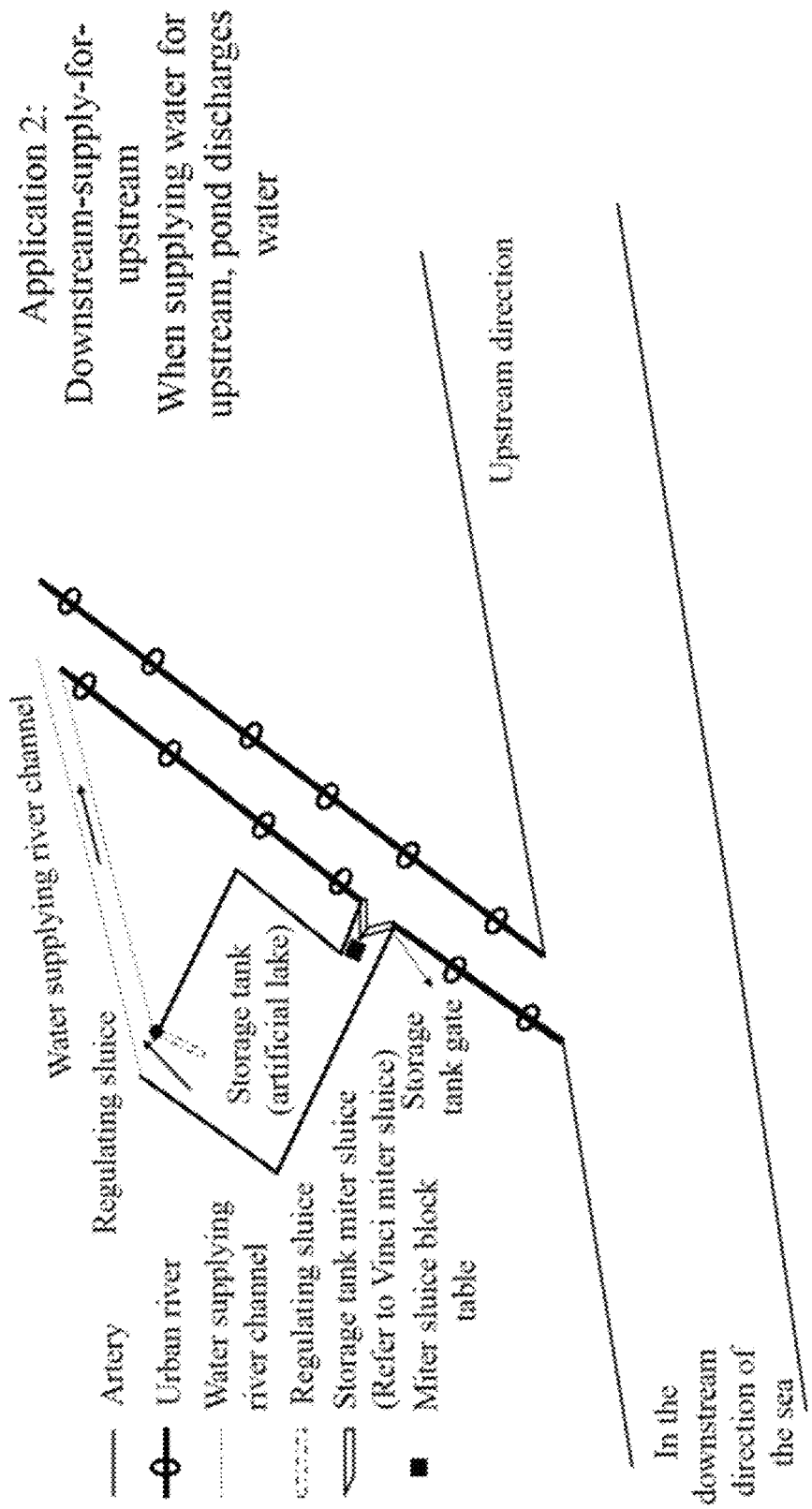
FIG. 5 is a schematic diagram of the application process of the tributary downstream-supply-for-upstream mode in the water supplement in the embodiment of the present application.

As shown in FIG. 3-FIG. 5, at high tide, the regulating sluice on one side of the water supplying river channel is closed, and the water level of the river channel is raised, so that the miter sluice is automatically opened and the water flows into the storage tank.

At low tide, the regulating sluice is still closed, and the water level begins to drop, and the overflow water pushes the miter sluice to close automatically. With the tide ebbs, the water level outside the gate drops rapidly, resulting in the difference between the internal and external water levels, and the water pressure in the pool is greater, which makes the miter sluice close more tightly and blocks the leakage of water.

When the river is short of water and needs to be replenished, the water level in the storage tank is high. The regulating sluice on one side of the water supplying river channel of the storage tank is pushed open to discharge water by using the gear motor driving system, and the water mass is added to the middle of the urban river channel.

In this application mode, the gate of the storage tank (i.e., the gate of the water diversion section of the storage tank) combines the miter sluice with the laminated water-blocking platform, the effect of automatically opening the gate with tidal power at high tide and automatically closing the gate at low tide is realized, thus effectively storing water. This process does not need manual intervention, and does not need electricity to drive the gate of the storage tank.

Figure 6:
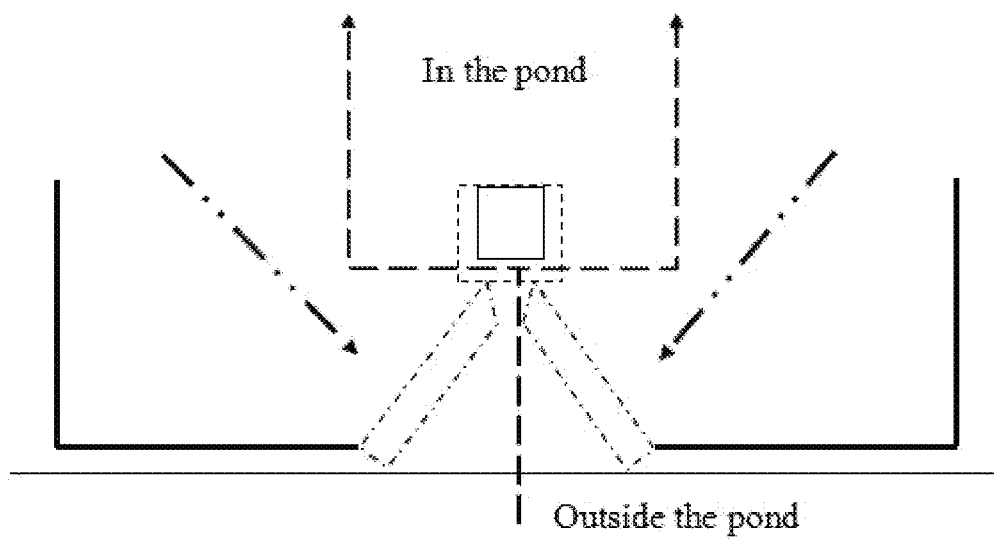
FIG. 6 is a schematic plan view of the laminated water-blocking platform at the gate in the embodiment of the present application.
Figure 7:
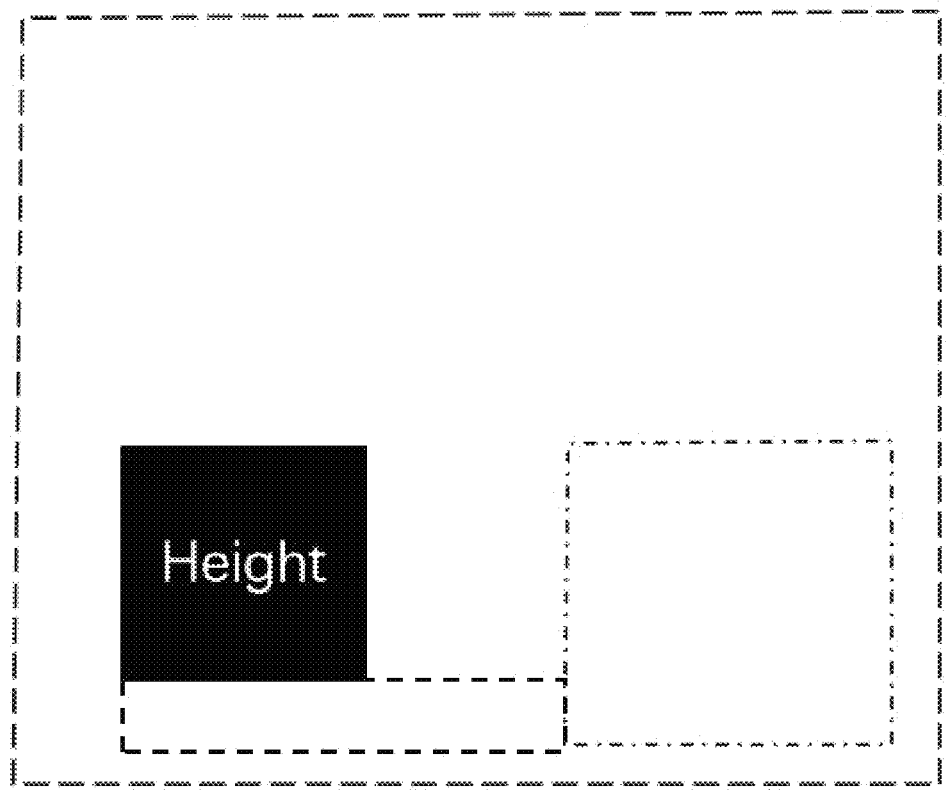
FIG. 7 is a schematic left view of the laminated water-blocking platform at the gate in the embodiment of the present application.
Figure 8:
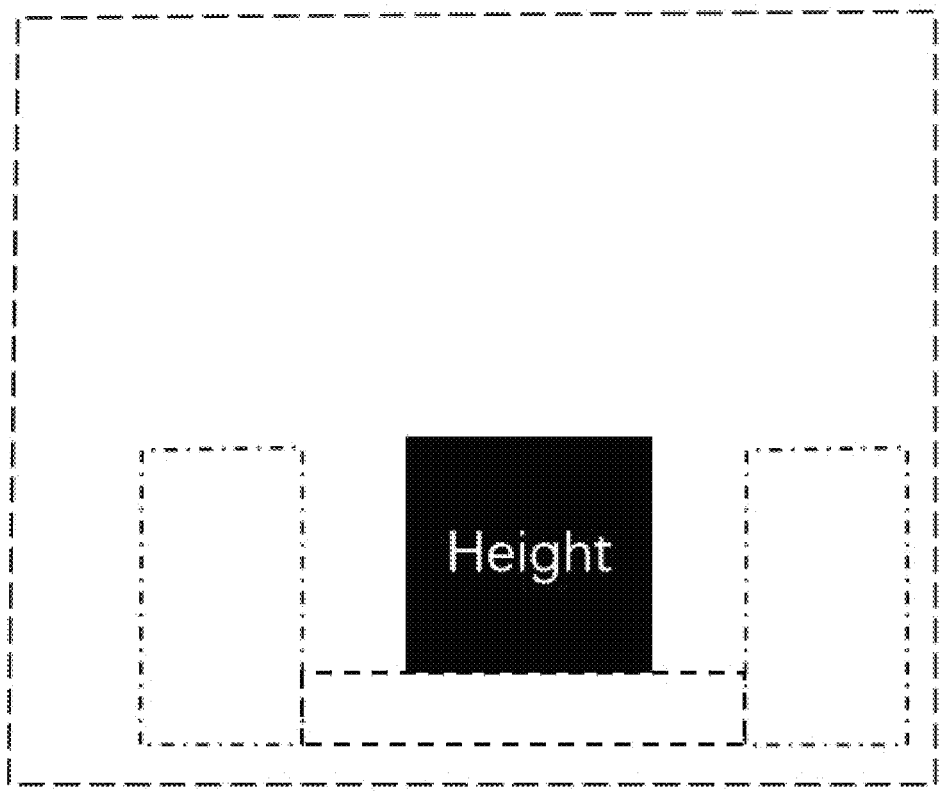
FIG. 8 is a schematic front view of the laminated water-blocking platform at the gate in the embodiment of the present application.

The laminated water-blocking platform is divided into two parts: high and low. The top view area of the high platform is smaller than that of the low platform. When the gate is opened, it may not be completely opened to be parallel to the water inflow direction by using the way of combining high and low platforms, and at this time, the gate is blocked by the low platform, but the water may continue to flow into the storage tank from the gap between the high platform and the low platform, as shown in FIG. 6. At low tide, when the water tends to flow out from the storage tank, the water is blocked by the high platform and flows out in the direction perpendicular to the gate on both sides, pushing the gate to close initially. With the low tide, the water level outside the storage tank drops, forming a water pressure difference, and the gate will be closed more tightly, thus effectively storing water.

In this application mode, the inlet end of the storage tank of this product, that is, in front of the tributaries and gates of the storage tank, needs to be provided with a slag-blocking net and a slow-flow sedimentation area to reduce sediment deposition within the range of gate opening and closing activities. Meanwhile, a concave structure is designed in front of the laminated water-blocking platform in the storage tank, which is used to collect the sediment entering the storage tank and is also convenient for cleaning the deposited sediment during the maintenance of the storage tank.

The application improves the dispatching technology of existing gate dams, and creatively puts forward the technical means of automatically storing water by tidal power, and carrying out ecological water supplement in dry season or in urban river channels that are short of water due to sewage interception.

The above is only the preferred embodiment of this application, but the protection scope of this application is not limited to this. Any change or replacement that may be easily thought of by a person familiar with this technical field within the technical scope disclosed in this application should be covered by this application. Therefore, the protection scope of this application should be based on the protection scope of the claims.

What is claimed is:

1. A method for carrying out ecological water supplement by using tidal power, comprising following steps:

constructing a first water supplying river channel at an upper reach of a tributary and at a middle reach of an artery, storing water at high tide and supplying water to the tributary at low tide using the first water supplying river channel; and connecting one end of a storage tank at an urban river channel, constructing a second water supplying river channel at an other end of the storage tank connected with the urban river channel, and supplying the water to a city using the interconnected storage tank, the urban river channel and the second water supplying river channel;

wherein a process of supplying the water to the city using the interconnected storage tank, the urban river channel and the second water supplying river channel comprises:

setting a regulating sluice at a joint of the storage tank and the second water supplying river channel, and setting a miter sluice at a joint of the storage tank and the urban river channel;

storing the water using the storage tank and the miter sluice at high tide;

in a process of opening the miter sluice, making a gate opened by the miter sluice not capable of being parallel to a water inlet direction using a water-blocking platform; at low tide, making the water flows out from a direction perpendicular to the gate using the water-blocking platform, and pushing the gate of the miter sluice to be closed initially; and when the urban river channel is short of the water due to a sewage interception project, performing a water supplement for the urban river channel using the storage tank, the regulating sluice and the second water supplying river channel;

a process of storing the water at high tide and supplying the water to the tributary at low tide using the water supplying river channel comprises:

setting a first gate at each intersection of the first water supplying river channel and the tributary, and setting a second gate at each intersection of the first water supplying river channel and the artery;

at high tide, closing the first gate, and opening the second gate to allow the water of the artery to enter the first water supplying river channel, so that the first water supplying river channel is capable of storing water of the artery; and at low tide, closing the second gate, and when the water supplement is needed for the tributary, opening the first gate to perform the water supplement for the tributary;

a process of storing the water using the storage tank and the miter sluice at high tide and low tide comprises:

at high tide, closing the regulating sluice, and the miter sluice is automatically opened using a high water level after the tide rises, so that the water flows into the storage tank;

at low tide, closing the miter sluice, and closing the miter sluice using overflow water flow, and closing the miter sluice using a water level difference between inside and outside, and making the storage tank store water; and setting a slag-blocking net and a slow-flow sedimentation area in front of the gate of the miter sluice, reducing sediment deposition during gate opening and closing activities using the slag-blocking net and the slow-flow sedimentation area, designing a concave structure in front of the water-blocking platform, and collecting sediment entering the storage tank using the concave structure.

2. The method for carrying out the ecological water supplement by using the tidal power according to claim 1, wherein opening and closing time of the second gate is an automatical opening and closing at time points corresponding to a high tide level and a low tide level using a daily ebb and flood schedule and data of a tidal observation station, and adjusting an opening and closing state in real time according to a water flow direction using a water flow direction monitoring device.

3. The method for carrying out the ecological water supplement by using the tidal power according to claim 1, wherein the process of performing the water supplement for the urban river channel using the storage tank, the regulating sluice and the second water supplying river channel comprises:

opening the regulating sluice using a gear motor driving system, and making the water stored in the storage tank enter the urban river channel through the second water supplying river channel using the high water level in the storage tank.

\* \* \* \* \*